Patented July 22, 1930

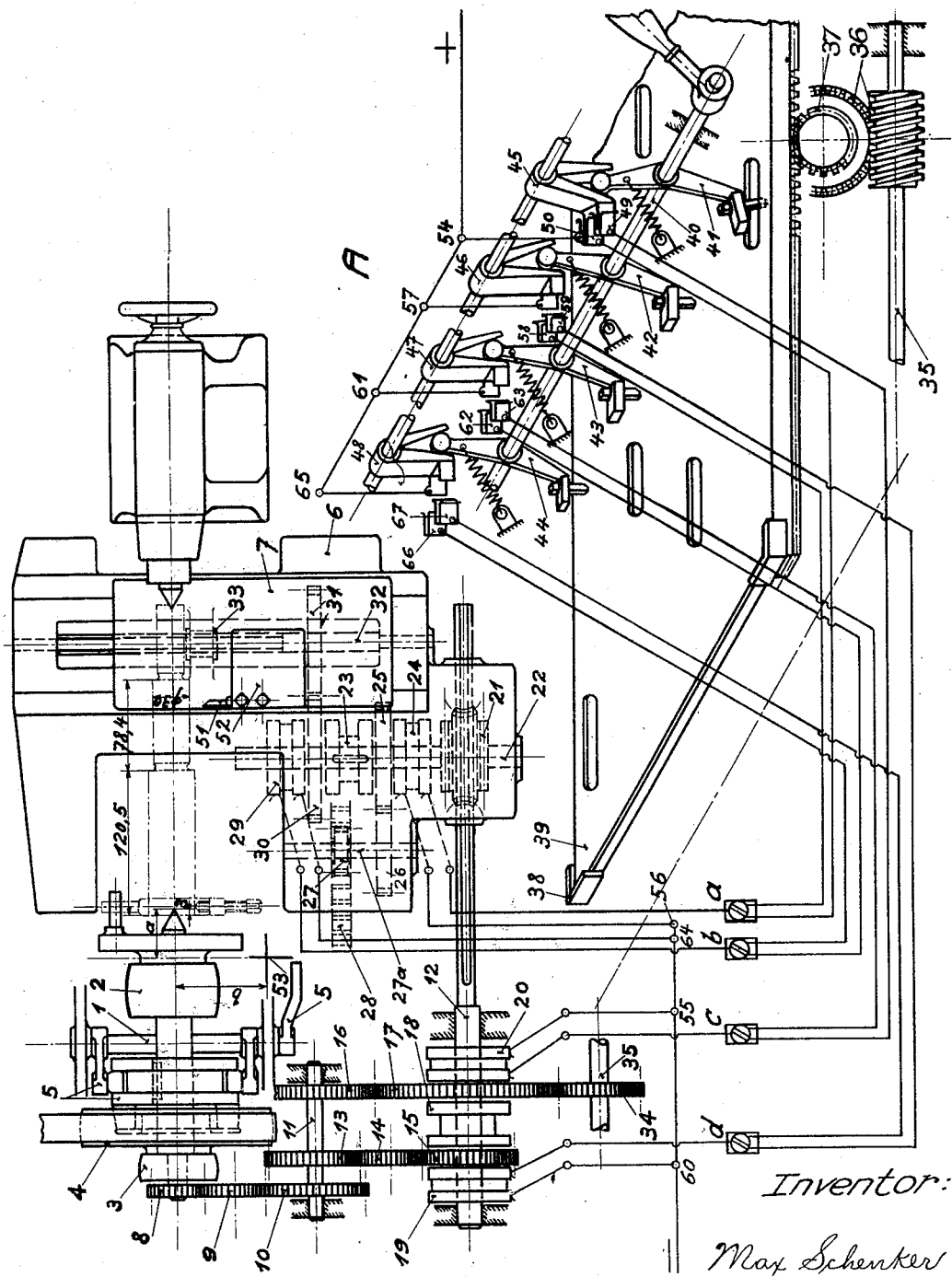

1,771,192

UNITED STATES PATENT OFFICE

MAX SCHENKER, OF SCHONENWERD, SWITZERLAND

METHOD OF MACHINING MATERIALS

Application filed September 26, 1927, Serial No. 222,139, and in Switzerland October 1, 1926.

In machining materials for the purpose of producing determined work the tool used for cutting material must always be moved in a determined manner relatively to the work or vice versa. For instance in turning the work revolves relatively to the lathe and simultaneously a suitable feed motion is imparted to the cutting tool. The original lathes have been completely actuated by the operator who had to effect the revolving movement of the work as well as the feed motion of the cutting tool by a hand or foot drive. A further step in improving such a lathe consisted in causing the revolving movement of the work to be performed by a driving motor so that the operator had only to take care of the feed motion and to the cutting in or out of the revolving motion. With later constructions the feed motion is caused mechanically by coupling the leading screw with the motor. Only the cutting in and out of the revolving motion and of the feed motion is then left to the operator. A further and last step consists in causing the last mentioned operations to be automatically controlled by the machine. With this step the automatic operation of machine tools has been reached.

A disadvantage of the known automatic machine tools consists in the fact that, as a rule, they are only adapted to produce a determined work and that it requires comparatively complicated adjustments of the machine tool if the latter has to be transformed to produce other works of a similar type.

The subject matter of the present invention is a method of machining materials in which the movements of the cutting tools relatively to the work to be machined and necessary for machining the latter to definite dimensions are automatically controlled by a controlling device in such a way that by exchanging a key, such as a perforated card, which determines the respective relative movements, other relative movements may be carried out with the same machine and thereby work of other shape may be automatically produced.

Such a method of mechanical machining may be carried into effect with comparatively simple means, as, for instance, in turning there are only a few elementary motions by the combination of which the relative movement of work and tool for producing even complicated work is obtained.

A constructional example of a device for carrying into effect the method according to the present invention is diagrammatically illustrated on the accompanying drawing, the machine tool working according to this method being a lathe.

The mandrel or spindle 1 of the head stock is journaled in the bearings 2 and 3; on the spindle 1 the driving pulley 4 is arranged and 5 designates the clutch means for coupling pulley and spindle manually. The movements of the lathe saddle 6 and of the top slide 7 are derived from the spindle 1 by the intermediary of the gear wheels 8, 9 and 10 and the counter shaft 11. The latter drives the spindle 12 in one direction of rotation by means of the gear wheels 13, 14 and 15, the latter being coupled to the clutch part 18 by the magnetic clutch 19, and in the other direction of rotation by means of the gear wheels 16 and 17, the latter being coupled to the clutch part 18 by the magnetic clutch 20. By the worm gear 21 the spindle 12 causes the rotation of the countershaft 22 mounted in the lathe saddle 6. From the countershaft 22 the longitudinal travel of the lathe saddle 6 is derived by the intermediary of the clutch part 23, magnetic clutch 24, gear wheels 25 and 26, countershaft 27ª, mounted in the bed of the lathe, gear wheel 27 and the toothed rack 28 mounted on the lathe saddle 6. The surfacing motion of the top slide is derived from the countershaft 22 by the intermediary of clutch part 23, magnetic clutch 29, gear wheels 30, 31, the screw threaded spindle 32 mounted in the lathe saddle 6 and nut 33 cooperating with the spindle 32.

The controlling device A forms a self-contained group. By means of the gear wheels 17 and 34, shaft 35, worm gear 36 and toothed rack and pinion 37, the frame 38 and the key or perforated card 39 fixed to the frame are uniformly displaced in the longitudinal direction of the frame 38. Transverse to the latter the feeler shaft 40 is mounted on which the feeler levers 41, 42, 43 and 44 are loosely mounted, these levers cooperate with the contact levers 45, 46, 47 and 48 respectively. The lower end of the feeler lever slides on the key 39 which is provided with slots. If the end of any of these feeler levers drops into a slot of the key 39 the respective contact lever is pushed in the forward direction and cooperates with the contact springs whereby a circuit is closed and the lathe saddle 6 or top slide 7 is caused to move. When the end of the feeler lever is raised again by the end of the slot the contact lever is moved away from these contact springs and the circuit is opened, whereby the movement caused by the previously closed circuit is interrupted. In the drawings the feeler lever 41 cooperates with a slot of the key 39 and the contact lever 45 is in engagement with the contact springs 49 and 50 and the following circuits may be closed: feeler lever 41: backward movement of the lathe saddle: positive pole—branching point 54—contact 49—terminal $c$—magnetic clutch 20—branching point 55—negative pole; positive pole—branching point 54—contact 50—terminal $a$—magnetic clutch 24—branching point 56—negative pole.

Feeler lever 42: forward movement of the lathe saddle: positive pole—branching point 57—contact 59—terminal $d$—magnetic clutch 19—branching point 60—negative pole; positive pole—branching point 57—contact 58—terminal $a$—magnetic clutch 24—branching point 56—negative pole.

Feeler lever 43: backward surfacing motion: positive pole—branching point 61—contact 63—terminal $c$—magnetic clutch 20—branching point 55—negative pole; positive pole—branching point 61—contact 62—terminal $b$—magnetic clutch 29—branching point 64—negative pole.

Feeler lever 44: forward surfacing motion: positive pole—branching point 65—contact 67—terminal $d$—magnetic clutch 19—branching point 60—negative pole; positive pole—branching point 65—contact 66—terminal $b$—magnetic clutch 29—branching point 64—negative pole.

It is obvious that owing to the positive connection between the drive of the controlling device and the drive of spindle to a displacement of the key of a determined length a determined displacement of the lathe saddle or of the top slide corresponds. The ratio of these two displacements may, for instance, be so chosen that a determined length of a slot causes a displacement of the lathe saddle or of the top slide of the same length. In the above described example the lathe works with a constant speed and with a uniform feed motion. Obviously by increasing the number of the feeler levers and by providing further clutches and corresponding transmission gearings other speeds and feed motions may be controlled by the key, or with the key and a special feeler lever cooperating with slots of the key a special tool of a revolving tool box may be brought to action.

It will be understood from the above description that the tool may be moved with different speeds and over accurately limited stretches in the two directions in which the feed motion is effected, i. e. parallel and at right angles to the axis of rotation of the work. These few operations and motions may be joined to each other in a practically non-limited number of ways. By inserting another key having a different combination of the slots another combination of elementary operations is set up and thereby the relative movements of tool and work necessary for producing a work of different shape are automatically caused. A machine tool constructed in this manner is an automatic machine tool which may be transformed in the shortest possible time to produce different work, all that is necessary is the insertion of another perforated card or key; this machine tool serves to make use of the advantages and the saving in labor inherent to the hitherto known automatic machine tools, however, not only in producing work in a large series but even in single numbers.

The novel method may further be rendered very efficient by causing the relative movements of work and tool so that the work on the one hand and the tool on the other hand are moved relatively to a common measuring base. In the example illustrated it is assumed that a cylindrical portion of 78.4 mm. length and 30 mm. dia. of the work has to be turned. The tool 51 is held in the tool holder 52. Saddle and top slide are now so displaced that the cutting edge of the tool 51 is exactly below the cross-threads 53 provided on the lathe, which is at distances $a$ and $b$ from the centre of the spindle. In order to turn the above mentioned cylindrical portion the tool must be displaced from the measuring base by the measure $a-3+120,5+78,4$ mm. in the longitudinal direction towards the tail-stock. In the row of slots in the key cooperating with the feeler lever 41, which controls the backward movement of the lathe saddle, a slot must be provided which corresponds to the above displacement. Thereupon the tool must be moved in the direction towards the axis of rotation of the work to the diameter of 30 mm. by providing a slot in the key which cooperates with the feeler lever 44 and which corresponds to a displacement of $b$ minus 15 mm. If now a further slot of the length of 78.4 mm. and cooperating with the feeler lever 42 (which controls the forward movement of the lathe saddle) is provided, the tool starts to cut and a cylindrical portion of 78.4 mm. length and of a diameter of 30 mm. is produced. The machine thus moves the tool in accordance with prescribed measurements in an accurately controlled manner parallel and at right angles from the measuring base relatively to the axis of rotation, whereby a setting of the tool to the work to be machined and the use of measuring instruments and gauges by the operator is rendered superfluous. No matter what kind of work has to be produced, it is sufficient to adjust the cutting edge of the tool always in the same manner to coincide with the measuring base. This is required every time a tool is exchanged for another or when a tool has worn.

Obviously besides the above described manner of carrying into effect the present method a large number of other solutions are possible without departing from the spirit of the present invention.

In the above described example the control of the machine tool by the controlling device is effected by electrically operated means. Obviously the feeler lever may cause the cutting in and out of the clutches by any known mechanical transmission means.

The above described method of machining materials may be used with any solid materials such as metals, wood, stone, insulating materials and so on and any process of machining materials such as turning, planing, milling, grinding, drilling and the like may be controlled by said method.

I claim:

1. The method of operating a machine tool which comprises relatively moving the work and tool, forming a key or record operatively connected with the work to move in timed relation thereto, whose controlling elements are determined by measurements of the finished work and the distance of the work from a measuring base on the machine, and controlling the operations of the machine tool by said record without manual adjustments of any of the parts of the machine tool.

2. The method of operating a machine tool which comprises, establishing a measuring base on the machine, placing the cutting edge of the tool at a point located on the measuring base a certain distance from the axis of the work piece, displacing the tool longitudinally of the latter a distance from said point corresponding to the length of the work piece, imparting relative longitudinal and transverse movements to the tool, forming a record operatively connected with the work to move in timed relation thereto, with controlling elements determined by measurements of the finished work, and controlling said movements by said record without manual adjustments of any of the parts of the machine tool.

3. The method of operating a machine tool which comprises establishing a measuring base on the machine, placing the cutting edge of the tool at a point located on the measuring base a certain distance from the axis of the work piece, displacing the tool longitudinally of the latter a distance from said point corresponding to the length of the work piece, imparting relative longitudinal and transverse movements to the work and tool, forming a record operatively connected with the work to move in timed relation thereto, with a plurality of slots of a length determined by measurements of the finished work for controlling said movements, whereby an exchange of the record causes the machine tool to carry out different relative movements and to automatically produce different work.

4. In a machine of the character described, the combination with a work support and a tool carrier, of a common measuring base, mechanism for moving the support and carrier relative to said measuring base, means for controlling the operation of said mechanism, and a single controlling member operatively connected with the work to move in timed relation thereto, having a plurality of elements proportioned in accordance with the dimensions of the work and relatively to said measuring base adapted to automatically actuate the controlling means for determining the extent of movements necessary for obtaining the finished work without manual adjustments of any parts of the machine.

5. In a machine of the character described, the combination of a measuring base fixed on the machine frame, a cutting tool, means for moving the latter relatively to said measuring base and to the work, means for moving the work relatively to the tool, a record operatively connected with the work to move in timed relation thereto, having perforations proportioned in accordance with the dimensions of the finished work, means for positively moving said record, and control members engaging in said perforations for causing the cutting in and out the relative movements of the tool and work without manual adjustments of any parts of the machine.

6. In a machine of the character described, the combination with a work support, and a tool carrier, of a measuring base on the frame of the machine, mechanism for moving the carrier relative to said base and work, mechanism for moving the work relatively to the tool, a plurality of members for controlling the movement of said mechanism, means for actuating the controlling members operatively connected with the work to move in timed relation thereto, comprising a record having a plurality of slots adapted to be engaged by said members and proportioned in accordance with the dimensions of the work and relatively to the measuring base, and means for positively moving said record, thereby cutting in and out the relative movements of the tool and work without manual adjustment of any parts of the machine.

In testimony whereof I have signed my name to this specification.

MAX SCHENKER.